United States Patent Office 3,018,785
Patented Jan. 30, 1962

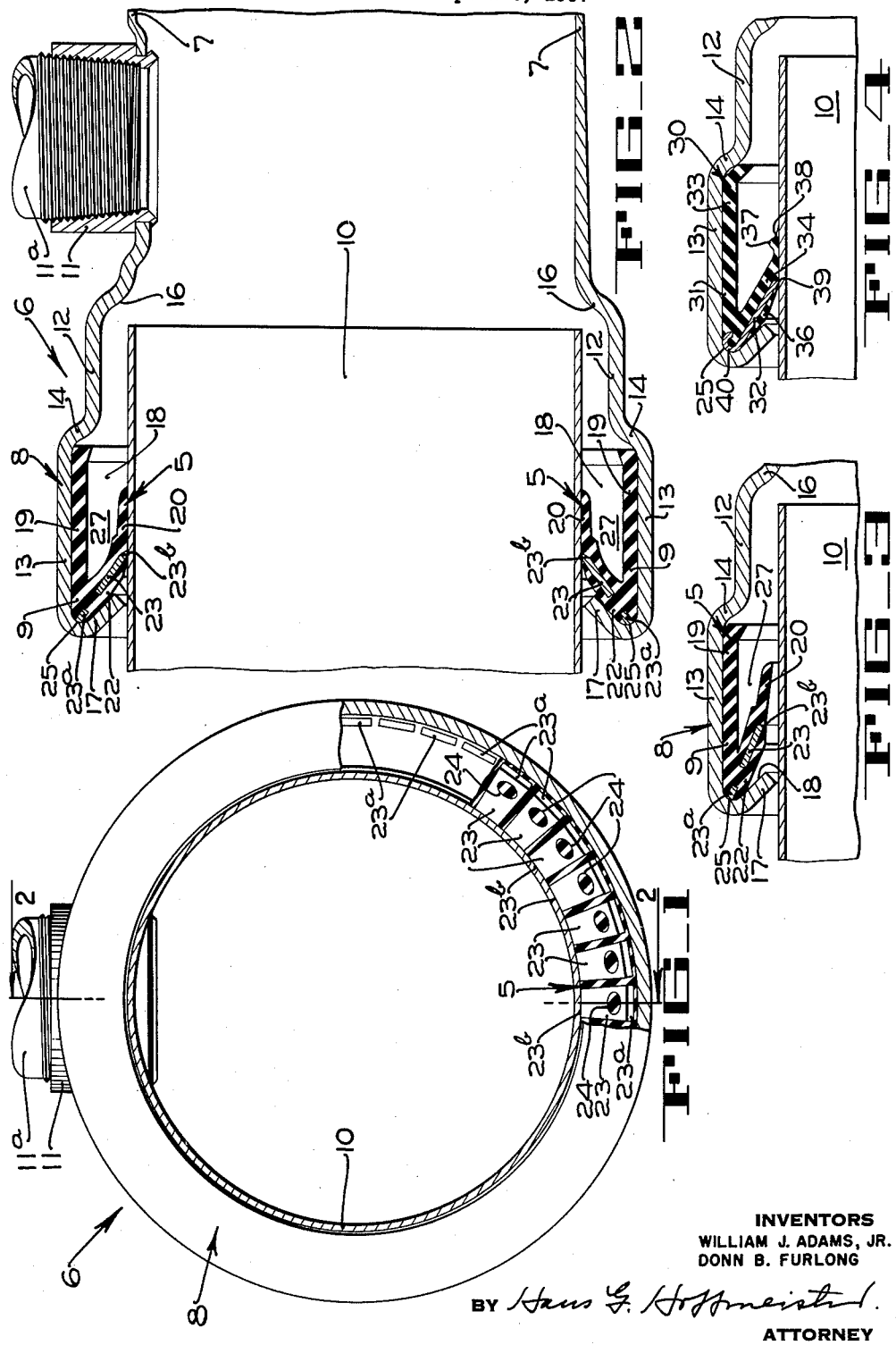

3,018,785
PIPE COUPLING
William J. Adams, Jr., Campbell, and Donn B. Furlong, Santa Clara, Calif., assignors to FMC Corporation, a corporation of Delaware
Filed Apr. 5, 1957, Ser. No. 650,903
9 Claims. (Cl. 137—107)

This invention appertains to pipe fittings and more particularly relates to a coupling for an irrigation pipe system having an improved means for sealing and locking together adjacent sections of pipe.

When irrigating with a portable irrigation system, a number of sections of pipe are used which must be coupled and uncoupled and moved from place to place many times before the irrigation is completed. Therefore, it is quite important to have pipes and pipe fittings which are both light in weight and which may be easily and rapidly coupled and uncoupled.

The water pressure used in these portable irrigation systems is usually such as to require positive locking means to prevent adjacent sections of pipe from becoming disconnected from each other by being moved axially relative to each other when water is directed through the pipe line. Many locking means heretofore provided have been costly and quite frequently require several parts which are cumbersome and difficult to operate. Moreover, many of the existing locking means require that the end of the male pipe section be grooved or beaded. This is not only costly, but quite frequently makes the coupling and uncoupling process difficult.

It is, therefore, one object of the present invention to provide an improved self-sealing and self-locking pipe coupling.

Another object is to provide a self-sealing and self-locking pipe coupling which may be easily and rapidly coupled and uncoupled.

Another object is to provide a self-sealing and self-locking pipe coupling which is operable under conditions of considerable misalignment of adjacent pipe sections.

Another object is to provide a self-sealing and self-locking pipe coupling having certain portions thereof normally spaced from a pipe to be coupled and arranged to be resiliently deflected into locking engagement against the pipe by fluid pressure.

Another object is to provide a fluid sealing and locking unit which is self-releasing, when fluid pressure is removed therefrom.

These and other objects and advantages of the present invention will be apparent from the following description and drawings, in which:

FIG. 1 is an end elevation of the pipe coupling of the present invention, having certain parts cut away to more clearly show internal parts thereof.

FIG. 2 is an axial section of the coupling taken along lines 2—2 of FIG. 1, and showing the sealing and locking unit of the coupling in sealed and locked engagement.

FIG. 3 is a fragmentary axial section of a portion of the coupling of FIG. 1, showing the sealing and locking unit in an unlocked and unsealed position.

FIG. 4 is a fragmentary axial section similar to FIG. 3, showing a modified form of the sealing and locking unit disposed therein in locked and sealed position.

The pipe coupling 6 (FIGS. 1 and 2) of the present invention comprises an enlarged housing 8 and an annular fluid sealing and locking unit 5 inserted therein. A male pipe section having a smooth end portion 10 is arranged to be inserted within the housing 8 and within the unit 5. A suitable riser pipe outlet 11 and riser pipe 11a are secured in liquid tight relation on the housing 8.

The housing 8 is rigidly connected on one end of the pipe 7 by any suitable means such as by clamping, or, it may be formed integrally therewith, as shown in FIG. 2, by a process of rolling. The housing 8 is formed in two annular steps 12 and 13 which are interconnected by a transition section 14. The step 12 is somewhat larger in diameter than the pipe 10 in order to permit axial misalignment of the pipe 10 therein. A slanted section 16 is formed integrally with the step 12 and serves to reduce the diameter of the housing 8 to that of the pipe section 7. The step 13 is larger in diameter than the step 12 and defines, with the transition section 14 and an inturned annular end flange 17, a seal receiving chamber 18.

The unit 5 includes an annular sealing and locking gasket or ring 9 made of flexible resilient material such as rubber. This ring, which is of substantially V-shaped cross-section, is received in the chamber 18 of the housing 8 and comprises an outer leg 19, an inner leg 20, and a bight section 22 which is formed integrally with the legs 19 and 20. A plurality of spaced, rigid locking members 23 are moulded in the resilient material of the ring 9 and are arranged to lie partially in the inner leg 20 and partially in the bight section 22 of the ring. In order to secure the locking members 23 to the resilient material of the ring 9 without the use of any special bonding finish on the surface of the locking members 23, a hole 24 (FIG. 1) is provided in each of the locking members 23 and a portion of the resilient material of the ring is received in the hole 24 when the ring is formed. One end 23a of each of the locking members 23 is curved and positioned so as to abut the curved inner surface of the seal-receiving chamber 18 at a point 25 between the step 13 and the end flange 17. The opposite end portion 23b of each locking member 23 is sharpened and is arranged to project out of the seal and normally lies in spaced relation to the outer surface of the male pipe section 10 when no pressure is exerted on the ring 9, as clearly shown in FIG. 3. By placing a substantial portion of the locking members 23 in the relatively stiff bight section 22 of the ring 9, and also by locating the holes 24 in the bight section 22, the resilient force tending to hold the locking members in their normal or unlocked position is quite strong. The sharpened end portions 23b of the locking members 23 are arranged to contact the pipe 10 in gripping engagement when a sufficient fluid pressure is exerted in a cavity 27 defined by the legs 19 and 20 and the bight section 22 of the ring 9. Besides this locking function, the member 23 adds rigidity to and reinforces the inner leg 20 of the ring 9 by wedging between the pipe 10 and the point 25 of the housing 8.

Since the open end portion of the inner leg 20 is not reinforced and project a considerable distance outwardly from the sharpened ends 23b of the member 23, a relatively light fluid pressure will be sufficient to collapse the end portion of the inner leg 20 against the pipe 10 to provide a leak-proof connection therebetween, even though the locking members 23 are not caused to grip the pipe 10. Thus, the coupling 6 may be used for sealing joints in low pressure irrigation systems even though the pressure is not sufficient in such systems to cause the locking members to grip the pipe 10. In this case, frictional contact of the filled sections of pipe 7 and 10 against the ground is sufficient to prevent axial separation of the pipes. Normally, however, fluid pressure within the coupling 6 and cavity 27 will be sufficient to cause the locking members 23 to grip the pipe 10.

In putting the improved pipe coupling of the present invention into operation, the end portion 10 of the male pipe section is first inserted in the housing 8. Water is then pumped under high pressure through the coupling 6 which, because of the axial forces present, tends to separate the pipes 7 and 10. A portion of this high pressure water enters the cavity 27 and forces the ring 9 into the position shown in FIG. 2 so that the inner leg 20 is sealed against the pipe 10 and the sharpened end portions 23b of the locking members 23 are forced into gripping engagement with the smooth outer surface of the pipe 10 to prevent axial movement thereof.

Because the locking members 23 are spaced from each other and are caused to move and grip independently of each other on the smooth surface of the pipe 10, the axial force exerted by fluid pressure tending to separate the two pipe sections will be evenly distributed among the many locking members 23 even though the two pipes 7 and 10 are considerably misaligned. If the pipe sections 7 and 10 are aligned, the locking member 23 will grip the outer surface of the pipe 10 in a transverse circular pattern thereon. If the pipes are disposed at an angle relative to each other, the locking members 23 grip the outer surface of the pipe 10 in an elliptical pattern.

After the pressure is removed from within the coupling 6 and from within the cavity 27 in the ring 9, the resiliency of the material from which the ring 9 is formed is sufficient to deflect the locking members 23 away from the pipe 10 without requiring any special unlocking motion such as twisting, pushing or pulling of the pipe 10. The pipe 10 may then be removed from the housing 8 by merely sliding the pipe axially therefrom.

When the inner leg 20 of the ring 9 is in the unstressed condition, the leg 20 is slightly larger in diameter than the outside diameter of the pipe 10, providing an annular drain passage through which fluid can drain from the pipe after the pressure has been removed. This self-draining feature greatly improves working conditions since the operators are not required to uncouple and move pipes which are partially filled with water.

A modified form 30 of the sealing and locking unit of the present invention is shown in FIGURE 4 and is arranged to be positioned in the housing 8 and to be disposed in locked and sealed engagement against the pipe 10. The sealing and locking unit 30 comprises an annular resilient ring 31 of V-shaped cross section having a plurality of rigid locking members 32 moulded therein. The ring 31 comprises an outer leg 33, an inner leg 34 and a bight section 36. The inner leg 34 has an annular bead 37 formed adjacent the open or free end 38 thereof. This bead and the inner leg 34 must be deformed by fluid pressure introduced within the coupling 6 before the ring 31 can be forced into sealed engagement against the pipe 10. Thus, the bead 37 aids in spacing substantially the entire inner surface of the leg 34 away from the pipe 10 when there is little or no fluid pressure exerted on the ring 31. The locking members 32, which are moulded in the bight section 36 and inner leg 34, are sharpened at their free ends 39 and have their outer end portions 40 rolled. The curvature of the rolled outer ends 40 of the locking member 32 is slightly sharper than the curvature at the point 25 of the housing 8, thereby permitting substantially frictionless pivotal movement of the locking members 32 against the housing 8. Since the modified sealing and locking unit 30 of the present invention operates in a manner which is substantially identical to that of the unit 5, the hereinabove description of the operation of the unit 5 will suffice for both.

From the foregoing description, it is apparent that the improved pipe coupling of the present invention provides improved means of axially locking and sealing two pipe sections together solely by the action of the fluid pressure in the coupling. An advantage of this improvement is that the coupling is operable with a male pipe section having a smooth outer surface devoid of grooves or projections which are necessary in other couplings for maintaining the pipe sections in coupled relation. Another advantage is that no special twisting or latching motions are required when coupling or uncoupling the pipe sections. Furthermore, the coupling of the present invention is inexpensive, is light in weight, is easily and rapidly coupled and uncoupled and will efficiently operate under conditions of considerable misalignment without detrimental effect.

It will be understood that various changes and modifications of the present invention may be made without departing from the spirit of the invention or the scope of the appended claims. Having thus described the present invention and the manner in which the same is to be used, what is claimed as new and desired to protect by Letters Patent is:

1. In a pressure-sealing and pressure-locking pipe coupling including an annular housing having an inturned end flange and adapted to receive therein the end of a pipe having a smooth surface, the improvement which comprises an annular resilient member of V-shaped cross section inserted in said housing and around the pipe and having an inner leg and a bight section, and a plurality of spaced rigid locking members having a hole in each member adjacent one end thereof and imbedded partially in said inner leg and partially in said bight section with said hole positioned in said bight section, one end of each locking member being arranged to be disposed in abutting engagement against the inturned flange of said housing and another end of each locking member being sharpened, each of said locking members being normally spaced from said pipe so that introduction of fluid pressure in said housing causes said bight section and said inner leg to be deflected to allow the sharp end of each member to independently engage the smooth surface of said pipe.

2. In a pressure-sealing and pressure-locking pipe coupling including an annular housing having an inturned end flange and adapted to receive therein the end of a pipe, the improvement which comprises a resilient seal ring of V-shaped cross section inserted in said housing and around the pipe and having an inner leg and a bight section, and a plurality of spaced rigid locking members imbedded partially in said inner leg and partially in said bight section, one end portion of each locking member being rolled and arranged to project outwardly from the bight section and the other end portions being sharpened and arranged to project through the inner surface of said inner leg, the rolled end of each locking member being disposed in abutting engagement against the inturned flange of said housing, the sharpened end of each of said locking members being normally spaced from the pipe so that introduction of fluid pressure into said housing causes said bight section and said inner leg to be deflected to force the sharpened end of each member independently into engagement against the surface of the pipe.

3. In a pressure-sealing and pressure-locking pipe coupling including an annular housing having an inturned end flange and adapted to receive therein the end of a pipe, the improvement which comprises an annular resilient gasket of V-shaped cross section inserted in said housing and around the pipe and having an inner leg and a bight section, an annular resilient bead formed on said inner leg adjacent the distal end thereof, and a plurality of spaced rigid locking members imbedded partially in said inner leg and partially in said bight section, one end portion of each locking member being rolled and arranged to project outwardly of the bight section to pivotally contact the inturned end flange and the other end portion thereof being sharpened and arranged to project through the inner surface of said inner leg, the sharpened end of each of said locking members being normally held in spaced relation from the pipe by the resilience of said ring and said bead so that introduction of fluid pressure in said housing causes said ring and said bead to be deflected to force the sharpened end of each member independently into locked engagement against the surface of the pipe.

4. A sealing and locking ring for a pipe coupling comprising an annular resilient bight section, an annular outer leg connected to said bight section and having an inwardly directed end portion, an annular resilient inner leg connected to said bight section and spaced from said outer leg, and a plurality of spaced locking members each having a sharpened end and a hole adjacent the other end thereof, said locking members being imbedded in said bight section and said inner leg in such a manner that resilient material of the bight section extends through said hole and said sharpened end projects through the inner surface of said inner leg.

5. A sealing and locking gasket for a pipe coupling comprising an annular resilient bight section, an annular outer leg connected to said bight section, an annular resilient inner leg connected to said bight section, the distal edge of said inner leg being spaced from said outer leg, and a plurality of spaced locking members disposed in said inner leg and in said bight section, said locking members each having one end portion rolled and arranged to project from the bight section, the other end of each of said locking members having a gripping edge projecting through the inner surface of said inner leg at a point spaced from said distal edge thereof.

6. A sealing and locking gasket for a pipe coupling comprising an annular resilient bight section, an outer leg connected to said bight section, an annular resilient inner leg connected to said bight section and spaced from said outer leg, an annular bead formed on the inner leg adjacent the distal end thereof, and a plurality of spaced locking members disposed partially in said inner leg and partially in said bight section, said locking members each having one end portion rolled and arranged to project from the bight section and the other end having a gripping edge projecting through the inner surface of the inner leg at a point between the bight section and the annular bead.

7. In a pipe coupling which automatically locks and releases in response to fluid pressure and having a housing adapted to receive therein the end of a pipe having a smooth outer surface, the improvement which comprises a resilient sealing and locking gasket of generally V-shaped cross section disposed in said housing and having an inner leg extending longitudinally of the pipe and inwardly toward the pipe and normally spaced from the outer surface of the pipe, and a rigid member embedded in said gasket having one end terminating in the bight portion of the gasket abutting said housing and the other end disposed in the inner leg of the gasket and projecting inwardly therefrom whereby the longitudinal axis of said locking member is inclined relative to the longitudinal axis of said pipe section, said rigid member being normally spaced from the pipe section whereby the introduction of fluid pressure in said housing causes the inner leg of said gasket to deflect so that said rigid member is forced into gripping engagement with the smooth surface of the pipe to prevent axial movement of the pipe relative to said housing and said gasket forms a seal between said housing and said pipe but, upon termination of fluid pressure in said housing, said inner leg resiliently returns to a spaced position allowing the pipe to drain and the end of the pipe to be withdrawn.

8. In a pressure-sealing and pressure-locking pipe coupling including a housing having an inturned end flange and adapted to receive the end of a pipe, the improvement which comprises a resilient gasket of V-shaped cross section fitted within said housing surrounding the pipe and having an outer leg and an inner leg extending longitudinally of the pipe and inwardly toward the pipe, and a plurality of spaced rigid locking members each having one end terminating in the apex of said V-shaped gasket abutting said housing and another end projecting through said inner leg whereby the longitudinal axis of each locking member is inclined relative to the longitudinal axis of said pipe, said locking member ends projecting through said inner leg and having a gripping edge resiliently maintained spaced apart from the outer surface of the pipe by said inner leg said inner leg and said locking members being arranged to be deflected by fluid pressure so that the gripping edge of each locking member is pressed into gripping engagement against the outer surface of the pipe to prevent axial separation of the pipe from said housing when a predetermined amount of fluid pressure is within said housing.

9. In a pipe coupling which automatically locks and releases in response to fluid pressure and having an annular housing adapted to receive the end of a pipe axially therein, the improvement which comprises an annular resilient member of V-shaped cross section disposed in said housing surrounding the pipe end and having an outer leg and an inner leg extending longitudinally of the pipe, and a rigid locking member partially embedded in said inner leg and having one end thereof terminating in the resilient gasket member and abutting said housing at the apex portion of the V and the other end projecting through said inner leg and inwardly therefrom, whereby the longitudinal axis of said locking member is inclined relative to the longitudinal axis of said pipe, the inner leg of said locking member being normally spaced from the pipe section whereby introduction of fluid pressure in said housing causes said inner leg to deflect and move said locking member into gripping engagement against the pipe to prevent axial separation of the pipe from said housing, the inner leg of said annular resilient member being of larger diameter than the pipe when said resilient member is in an unstressed condition so that said inner leg and said rigid locking member will be spaced from the pipe section upon elimination of the fluid pressure thus permitting the rapid removal or insertion of said pipe end and to allow fluid within the pipe to drain therefrom.

References Cited in the file of this patent

UNITED STATES PATENTS

| | | |
|---|---|---|
| 2,047,569 | Loomis | July 14, 1936 |
| 2,177,184 | Martin et al. | Oct. 24, 1939 |
| 2,451,354 | Ohls | Oct. 12, 1948 |
| 2,652,282 | Willetts | Sept. 15, 1953 |
| 2,730,116 | Rickard | Jan. 10, 1956 |
| 2,743,899 | Kinney | May 1, 1956 |
| 2,818,082 | Rickard | Dec. 31, 1957 |
| 2,871,333 | Stout | Jan. 27, 1959 |

FOREIGN PATENTS

| | | |
|---|---|---|
| 190,318 | Great Britain | Dec. 21, 1922 |